United States Patent [19]

Parmer

[11] 4,381,507
[45] Apr. 26, 1983

[54] FLUID CYLINDER POSITIONAL INDICATOR AND METHOD

[75] Inventor: Carl L. Parmer, Harrisburg, N.C.

[73] Assignee: D. E. McCraw, Jr., Charlotte, N.C.

[21] Appl. No.: 315,503

[22] Filed: Oct. 27, 1981

[51] Int. Cl.³ .............................................. G08C 19/04
[52] U.S. Cl. .................................. 340/870.38; 340/686
[58] Field of Search ............................ 340/870.38, 686

[56] References Cited
U.S. PATENT DOCUMENTS

| 1,231,964 | 7/1917 | Suchanek | 340/870.38 |
|---|---|---|---|
| 1,304,022 | 5/1919 | Cole | 340/870.38 |
| 1,312,191 | 8/1919 | McDonnell . | |
| 1,371,395 | 3/1921 | Rast . | |
| 1,442,716 | 1/1923 | Flower . | |
| 1,527,430 | 2/1925 | Frank | 340/870.38 |
| 1,557,957 | 10/1925 | Amrhein . | |
| 1,611,578 | 12/1926 | Aldeborgh . | |
| 1,683,710 | 9/1928 | Zitzmann . | |
| 2,155,529 | 4/1939 | Clench . | |
| 2,219,844 | 10/1940 | Lotter et al. . | |
| 2,322,278 | 6/1943 | Buckwalter . | |
| 2,361,462 | 10/1944 | Dickinson . | |
| 2,526,124 | 10/1950 | Dobson et al. | 340/870.38 |
| 2,759,448 | 8/1956 | Pitts . | |
| 2,918,085 | 12/1959 | Govan et al. . | |
| 2,987,714 | 6/1961 | Bonner et al. . | |
| 3,164,819 | 1/1965 | Rantsch et al. . | |

| 3,219,925 | 11/1965 | Borley et al. . |
|---|---|---|
| 3,296,521 | 1/1967 | Wildberger . |
| 3,355,690 | 11/1967 | Sorensen et al. . |
| 3,405,388 | 10/1968 | Byrne . |
| 3,654,549 | 4/1972 | Maurer et al. . |
| 3,671,692 | 6/1972 | Potter et al. . |
| 3,691,902 | 9/1972 | Lebzelter . |
| 3,741,013 | 6/1973 | Hering et al. . |
| 3,839,944 | 10/1974 | Swift . |
| 3,859,650 | 1/1975 | Prachar . |
| 3,889,528 | 6/1975 | Grikscheit et al. . |
| 3,896,280 | 7/1975 | Blake . |
| 3,997,887 | 12/1976 | Poynter . |
| 4,055,105 | 10/1977 | Wiese et al. . |
| 4,163,970 | 8/1979 | Allinquant et al. . |
| 4,206,455 | 6/1980 | Isakson . |
| 4,207,565 | 6/1980 | Isakson et al. . |

Primary Examiner—Thomas A. Robinson
Attorney, Agent, or Firm—Bell, Seltzer, Park & Gibson

[57] ABSTRACT

An apparatus and method for obtaining an electrical signal indicative of the degree of extension of a fluid cylinder, the signal being transmitted to a remote location for use in providing a remote readout of the cylinder position. The displacement of the piston is translated into a rotational movement of a threaded rod coupled to the piston. The rod is, in turn, coupled to a potentiometer or other device that provides an electrical signal indicative of the cylinder extension.

6 Claims, 2 Drawing Figures

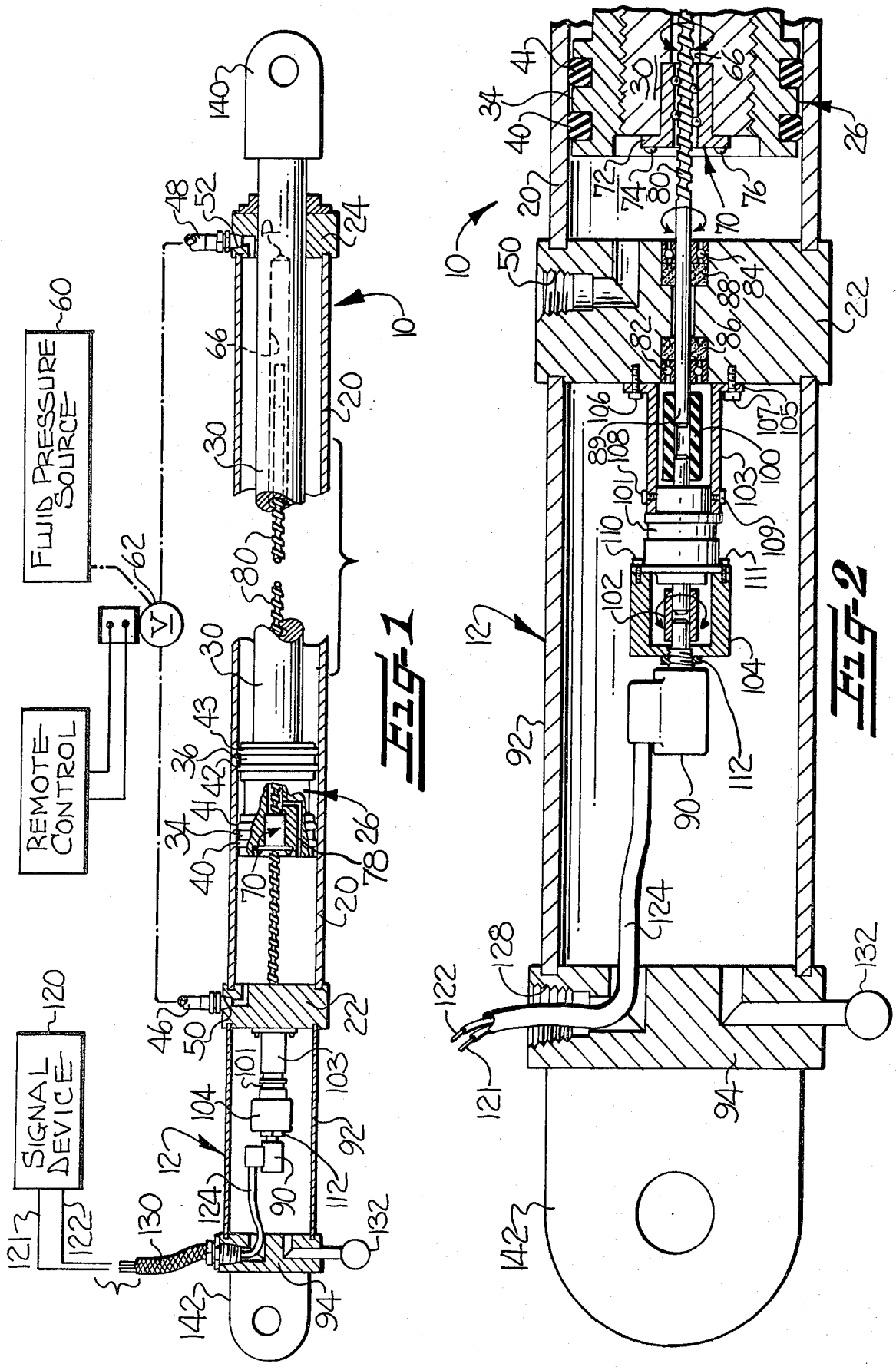

FLUID CYLINDER POSITIONAL INDICATOR AND METHOD

BACKGROUND OF THE INVENTION

1. Field of the Invention

The present invention relates to methods and apparatus for determining the degree of extension of a fluid cylinder. It particularly relates to methods and apparatus for obtaining an electrical signal indicative of the degree of extension of a fluid cylinder and transmitting such signal to a remote location where the signal may be used for various purposes, including the provision of a continuous readout of the cylinder extension.

2. Description of the Prior Art

Fluid cylinders, both hydraulic and pneumatic, are often used in applications where it is desirable to monitor the degree of extension of the cylinder. When the cylinder is located in an inaccessible or hostile environment, it becomes difficult to visually monitor the cylinder extension. For example, in the underwater construction of tunnels, bridges, piers, and the like, the problem of monitoring cylinder extension becomes particularly acute. Heretofore, the common practice has been to send a diver to the location of the cylinder to visually determine the cylinder displacement. It would be desirable in underwater applications, as well as numerous other applications, to have a system for transmitting information indicative of the cylinder extension to a remote location.

A number of systems have been proposed for this general purpose, some using the principle of an elongate transducer coupled to the piston movement, for example, a linear potentiometer in a control circuit that provides a voltage output indicative of the position of the piston. One such system includes the use of a potentiometer in association with the fluid cylinder where the potentiometer resistor is attached to the outside of the cylinder, with the potentiometer sliding contact being connected to the piston rod. This device has the disadvantage of the elements external of the cylinder being subject to mechanical breakage. Furthermore, the external elements are exposed to corrosives and other effects of the environment.

U.S. Pat. No. 3,355,690 is directed to a fluid cylinder system utilizing a sliding potentiometer wherein the potentiometer resistor, in the form of a coil, is disposed in an axial bore formed in the piston and piston rod. A disadvantage of this system is that the electrical components are exposed to the internal working environment of the cylinder where they must withstand the pressure of the hydraulic fluid and the stresses created by movement of the piston.

Other systems utilize reed switches located at spaced locations along the length of the cylinder, the reed switches sensing when the cylinder passes a particular finite location where the switch is located. These systems have the disadvantage of not providing a continuous reading of the piston position.

Yet another system manufactured by Temposonics Incorporated includes an elongate transducer beam which is located in the cylinder, and sealed to withstand the pressure of the hydraulic fluid, and a permanent magnet that is mounted on the moving piston. This system measures the time interval for an ultrasonic pulse to travel along the beam to the position of the magnet. A disadvantage of this system is the need for isolating the beam and its related electronic components from the pressurized hydraulic fluid. Another disadvantage is the high cost associated with the provision of the electronic, ultrasonic and magnetic components of the system.

Despite a long-standing need for a simple, reliable, commercially feasible system for determining the degree of extension of fluid cylinders that are located in inaccessible or hostile environments, no system is commercially available that has met the functional and commercial restraints.

SUMMARY OF THE INVENTION

The present invention provides an improved and commercially feasible system for obtaining an electrical signal indicative of the degree of extension of a fluid cylinder and transmitting the signal to a remote location. More particularly, in accordance with one application of the present invention it is possible to obtain an accurate, continuous remote readout of the extension of a fluid cylinder which is located in an inaccessible or hazardous environment without affecting the normal operating capabilities of the cylinder. Further, in accordance with other applications of the invention, the signal may be tied into a closed loop feedback system for control purposes, or directed through an integrator to determine the rate of change of voltage with respect to time and thereby determine the velocity of the cylinder. These and other applications are envisioned.

Broadly the invention provides means for translating the linear displacement of the piston of a fluid cylinder into a rotational displacement of a rotating element, e.g., a shaft or rod. The rotation of the rod is coupled to an electrical sensing means, such as a potentiometer for example, from which an electrical signal can be obtained which is functionally related to the rotational displacement of the rod. The electrical signal is transmitted to a remote location where it may be used for a number of purposes, for example, to generate a digital output corresponding to the cylinder extension.

In accordance with one aspect of the invention there is provided a fluid cylinder positional indicator comprising a cylinder defining a cylinder wall and cylinder ends and piston means including a piston disposed in the cylinder and a piston rod extending from the piston and through one of the cylinder ends. A longitudinal bore extends through the piston and a predetermined distance into the piston rod. A female threaded member is fixedly secured to the piston means internal of the cylinder for displacement therewith, and provides a threaded opening aligning with the axis of the bore. Preferably, the female threaded member is secured within the longitudinal bore. An elongate threaded rod is axially aligned with the threaded opening and has first and second ends, the first end thereof residing in the longitudinal bore. The threaded rod is journaled for rotation about its axis and restrained against longitudinal displacement and has external threads thereon that are threadingly engaged with the female threaded member such that displacement of the piston and the joined female threaded member imparts a rotation to the threaded rod. An electrical sensing means is coupled to the threaded rod for obtaining an electrical signal functionally related to the rotational displacement of the rod.

The fluid cylinder positional indicator is preferably a self-contained unit comprising the cylinder housing and a joined protective housing for the electrical sensing means. In a preferred embodiment one end of the threaded rod extends through an end of the cylinder, where it is journaled for rotation, and into the protective housing, where it is coupled to the electrical sensing means.

The protective housing may be filled with oil and sealed to provide a low-pressure, non-corrosive environment for the enclosed components.

In a preferred embodiment the electrical sensing means is a potentiometer from which an electrical output signal can be obtained which is functionally related to the rotational displacement of the threaded rod. The potentiometer may be connected to an electrical meter that is calibrated to give a direct readout of the fluid cylinder extension.

In accordance with another aspect of the invention, there is provided a method of generating electrical signals indicative of the degree of extension of a fluid cylinder and transmitting such signals to a remote location. The method includes the steps of: operating a fluid cylinder by imposing a selected fluid pressure on a piston face thereof and thereby moving the piston from a first position to a second position; translating the linear displacement of the piston to a directly proportional rotational displacement of a rotating element; translating the rotational displacement of the rotating element to an electrical signal functionally related to the rotational displacement of the rotating element; and transmitting the electrical signals to a location remote from the cylinder.

The present invention offers numerous advantages over prior art systems for indicating the degree of extension of a fluid cylinder. For example, in accordance with the present invention, there are no electrical components, or the like, located in the external environment where they may be subject to mechanical breakage or corrosion. Further, in the preferred embodiments of the invention the apparatus is a self-contained unit with the potentiometer sealed in an oil-filled protective housing; thus, the potentiometer and related electrical components are not directly exposed to the pressurized fluids used to operate the cylinder. The use of a ball screw or helix screw assembly for the mating threaded members provides the ability to control the degree of rotational displacement by simply selecting an appropriate pitch. The selection of the pitch is chosen to cooperate with the selected gear reduction and the number of turns of the potentiometer. The electrical signal obtained from the potentiometer lends itself to many possible applications, including the direct connection to a meter calibrated to directly display the cylinder extension. These and many other advantages of the present invention will become more apparent from the following detailed description.

BRIEF DESCRIPTION OF THE DRAWINGS

The invention will be more fully understood from the following detailed description thereof taken in connection with the accompanying drawings, which form a part of this application and in which:

FIG. 1 is a longitudinal section view through a fluid cylinder positional indicator of the invention;

FIG. 2 is an enlarged section view showing the potentiometer housing and a portion of the cylinder.

DETAILED DESCRIPTION

While the present invention will be described hereinafter with particular reference to the accompanying drawings, it is to be understood at the outset of the description which follows that it is contemplated that the present invention may be varied in specific detail while still achieving the desirable characteristics and features of the present invention. Accordingly, the description is to be understood as a broad enabling teaching directed to persons skilled in the applicable arts, and is not to be understood as restrictive.

Referring to the drawings, an illustrated embodiment of the apparatus of the invention includes a double-acting fluid cylinder 10 and an attached protective housing 12. Cylinder 10 includes a cylinder wall 20, a first cylinder end 22, a second cylinder end 24, and piston means comprising a piston 26 disposed for linear displacement intermediate the cylinder ends and a piston rod 30 extending from the piston and through the cylinder second end.

In the illustrated embodiment, piston 26 includes a pair of joined piston heads 34, 36 having annular seals 40, 41, 42, 43. Piston rod 30 is secured to piston 26 by means of external threads on the piston rod that are received in mating threads in the piston (FIG. 2).

Fluid pressure for operating on the faces of piston 26 is conveyed to the cylinder by fluid lines 46, 48 that communicate with ports 50, 52, respectively. Fluid is supplied to cylinder 10 by means of a fluid pressure source 60 operating through a remotely controlled electrical valve 62.

A longitudinal bore 66 extends through piston 26 and a predetermined distance into piston rod 30, to a point P. In the illustrated embodiment, the axis of bore 66 coincides with the axes of cylinder 10, piston 26 and piston rod 30.

A female threaded member 70 is fixedly secured to the piston means internal of the cylinder for displacement with the piston means, and provides a threaded opening aligned with the axis of bore 66. In the illustrated embodiment, member 70 is secured inside bore 66 and takes the form of a flanged nut having a flange 72 that is secured to piston rod 30 by means of fasteners 74, 76. Threaded member 70 is carried by the piston means and, therefore, is displaced longitudinally with the displacement of piston 26.

An elongate threaded rod 80 is axially aligned with the threaded opening of member 70 and is mounted partially within axial bore 66. The external threads of rod 80 are threadingly engaged with the threads of female threaded member 70 throughout the stroke of the piston such that displacement of piston 26 and the joined female threaded member 70 imparts a rotation to rod 80, the amount of rotation being directly proportional to the linear displacement of piston 26. Female member 70 and rod 80 may take the form of a ball screw or helix screw assembly.

Only the portion of rod 80 that will engage female threaded member 70 during a full piston stroke need be provided with external threads. As best shown in FIG. 2, the remaining portion of rod 80 extends through cylinder first end 22, where it is journaled for rotation. Appropriate bearings 82, 84 and seals 86, 88 are provided.

Preferably, and as illustrated, a small vent port 78 is provided in piston 26 communicatively connecting the bore 66 with interior of the cylinder adjacent the first cylinder end 22 and allowing venting of fluid from within bore 66 during movement of the piston.

An end portion 89 of rod 80 extends through the cylinder first end 22 and projects into protective housing 12 where it is coupled to a suitable rotary electrical sensing device 90 through a servo-coupling or flexible connector 100, a gear reducer 101 and a second flexible connector 102. The components inside housing 12 are mounted from cylinder end 22 by support means including a first support member 103 and a second support member 104. Support member 103 encloses flexible connector 100 and includes a base flange 105 secured to wall 22 by fasteners 106, 107 and an opposite end secured to gear reducer 101 by fasteners 108, 109. Second support member 104 encloses flexible connector 102 and is secured to gear reducer 101 by fasteners 110, 111 and is threadingly secured to sensing device 90 as shown at 112.

The flexible connectors absorb shocks and protect against binding in the event the components should fall out of axial alignment. Gear reducer 101 is selected with a reduction ratio suitable for use with the rotary electrical sensing device 90. The flexible connector and gear reducer are optional features.

The rotary electrical sensing device 90, when connected in a suitable circuit, provides an electrical signal functionally related to the rotational displacement of rod 80. Preferably, the rotary sensing device 90 has linear characteristics and is thus capable of providing an electrical signal which is directly proportional to the rotational displacement of rod 80, and in turn, the degree of extension of the cylinder.

There are a number of commercially available devices which are capable of providing a useful electrical signal. For example, rotary transducers are available which are capable of producing an analog or digital electrical signal in response to shaft rotation, and through a suitable control circuit, these analog or digital signals can be correlated to cylinder position. Also, commercially available rotary adjustable electrical components of the type which have varying electrical characteristics (such as capacitance, inductance or resistance) in response to shaft rotation can be connected in a suitable control circuit for obtaining an electrical signal corresponding to cylinder position. One type of device which is particularly suited for use as the electrical sensing device is a rotary potentiometer. The potentiometer, when connected in a circuit with a suitable power supply, provides an electrical signal, in the form of a varying voltage or current directly proportional to the linear position of the cylinder. This signal is transmitted to a remote signal device 120 which, as explained in more detail below, may be a meter, such as a digital voltmeter calibrated to give a digital output corresponding to the degree of extension of the cylinder. A particularly advantageous feature of using a potentiometer as the sensing device is that the voltage signal obtained from the potentiometer is independent of power interruption. In the event there should be a power interruption, the position of the cylinder will not be lost, and upon restoring power, the signal obtained from the potentiometer will accurately provide the position of the cylinder. The electrical signal is transmitted through conductors 121, 122 that are encased in an appropriate sheath 124. Sheath 124 passes through a conventional watertight inlet 128 and is preferably protected from the external environment by a cover 130 (FIG. 1).

Inlet 128 is preferably made watertight to seal the interior of protective housing 12 from external elements, this being especially important when the apparatus is used in an underwater environment. In a preferred manner of practicing the invention, housing 12 is filled with oil and hermetically sealed to provide a low-pressure non-corrosive environment for the sensing device 90 and optional flexible connectors and gear reducer. The oil within housing 12 is preferably maintained at ambient pressure. As noted above, seals 86, 88 are provided between the pressurized cylinder 10 and the interior of housing 12. In the event these seals should fail with resultant pressurizing of housing 12, the housing is provided with a pressure relief valve 132 which will bleed off pressure when the pressure in housing 12 exceeds the ambient pressure by some predetermined value, for example, by approximately 20 PSI.

The remote ends of the device, i.e., the end of piston rod 30 and the external face of end cap 94, are provided with conventional connectors 140, 142 for connection in the working environment.

The structure of the apparatus of the invention allows the rotary input to sensing device 90 to be controlled by appropriate selection of the pitch of the threaded member and the ratio of the gear reducer. It has been found that with a cylinder having a 54 inch effective stroke, a helix screw providing one revolution per linear inch of piston travel, an 8-to-1 gear reducer and a rotary linear potentiometer having 10 turns, the cylinder position may be remotely displayed on a digital voltmeter to an accuracy of within one-tenth inch.

The electrical signal obtained from the sensing device may be used for many useful purposes. In addition to providing a direct readout of cylinder position via a suitable meter, the signal may be tied into a closed loop feedback for various control purposes. Alternatively, the signal could be directed through a circuit that would provide an adjustable limit for the cylinder stroke. The signal could also be used to provide for automatic reciprocation of the cylinder between predetermined end points. Further, where the electrical signal is voltage, the voltage output may be directed through an integrator to determine the rate of change of voltage with respect to time, thereby determining the velocity of the cylinder stroke. Thus, with appropriate program control, the cylinder may be programmed to travel at a predetermined velocity for a certain distance, and then slow down or speed up to another velocity.

While the invention has been described in connection with preferred embodiments, it will be appreciated that numerous modifications may be made without departing from the true spirit and scope of the invention.

What is claimed is:

1. A fluid cylinder apparatus constructed for being mounted at its opposite ends to the working environment and having means for providing a signal accurately indicating the position of the piston thereof; said apparatus comprising a cylinder defined by an elongate cylindrical body portion and first and second end caps at opposite ends of said cylindrical body portion; piston means provided in said cylinder and including a piston head and a piston rod carried by the piston head, the piston head cooperating with said cylindrical body portion to form a fluid seal, and the piston rod extending longitudinally from the cylinder through said second end cap; connector means carried by the distal end of said piston rod to permit connection of the piston rod to the working environment; a longitudinal bore extending through said piston head and a predetermined distance into said piston rod; a female threaded member carried by said piston means for displacement therewith, said female threaded member having a longitudinally oriented threaded opening aligned with the axis of said longitudinal bore; an elongate threaded rod axially aligned with and extending longitudinally through the threaded opening of said female threaded member and having first and second ends, the first end thereof residing in said longitudinal bore, and the second end extending into said first end cap so as to project externally of said cylinder, and said threaded rod having external threads threadingly engaged with said female threaded member throughout the stroke of said piston means such that longitudinal displacement of said piston means and the female threaded member carried thereby imparts rotation to said elongate threaded rod; electrical sensing means mounted externally of said cylinder and coupled to the externally projecting end portion of said threaded rod for being rotatably driven thereby and being operable upon rotation thereof for obtaining an electrical signal functionally related to the rotational displacement of said threaded rod; a protective housing enclosing said electrical sensing means; and connector means carried by said cylinder apparatus at the end thereof opposite said longitudinally extending piston rod and cooperating with the cylinder apparatus to permit connection thereof to the working environment.

2. A fluid cylinder apparatus as set forth in claim 1 wherein said longitudinal bore has a diameter correlated with the diameter of said threaded rod for closely receiving the threaded rod therein.

3. A fluid cylinder apparatus as set forth in claim 1 wherein said connector means carried by the piston rod and by the cylinder apparatus comprise pivotal connectors for pivotal connection of the cylinder apparatus and the piston rod to the working environment.

4. A fluid cylinder apparatus as set forth in claim 1 wherein said protective housing is carried by said first end cap and said connector means for the cylinder apparatus is carried by the protective housing.

5. A fluid cylinder apparatus as set forth in claim 1 wherein said electrical sensing means comprises a potentiometer connected for obtaining a voltage output functionally related to the rotational displacement of said threaded rod.

6. A fluid cylinder apparatus constructed for being mounted at its opposite ends to the working environment and having means protectively mounted internally therein for providing a signal to a remote location accurately indicating the position of the piston thereof; said apparatus comprising a cylinder having a body portion formed of an integral elongate tubular structural member and first and second end caps provided at opposite ends of said cylindrical body portion and each having an axial opening therein; piston means provided in said cylinder and including a piston head and a piston rod carried by the piston head, the piston head cooperating with said cylinder body portion to form a fluid seal, and the piston rod extending longitudinally from the cylinder through said axial opening in said second end cap; connector means carried by the distal end of said piston rod to permit connection of the piston rod to the working environment; a longitudinal bore extending through said piston head and a predetermined distance into said piston rod; a female threaded member fixedly secured to said piston means for displacement therewith, said female threaded member having a longitudinally oriented threaded opening aligned with the axis of said longitudinal bore; an elongate threaded rod axially aligned with and extending longitudinally through the threaded opening of said female threaded member and having first and second ends, the first end thereof residing in said longitudinal bore, and the second end extending through said axial opening in said first end cap and projecting externally of said cylinder, and said threaded rod having external threads threadingly engaged with said female threaded member throughout the stroke of said piston means such that longitudinal displacement of said piston means and the female threaded member carried thereby imparts rotation to said elongate threaded rod; electrical sensing means carried by said first end cap externally of said cylinder and coupled to the externally projecting end portion of said threaded rod for being rotatably driven thereby and being operable upon rotation thereof for obtaining an electrical signal functionally related to the rotational displacement of said threaded rod; a protective housing carried by said first end cap and surroundingly enclosing said electrical sensing means; said protective housing comprising a tubular structural member having one end mounted to said first end cap and extending longitudinally therefrom along the same axis as the tubular structural member forming said cylinder body portion and forming a structural extension of said cylinder; and connector means carried by said protective housing to permit connection of the cylinder to the working environment.

* * * * *